(12) United States Patent
Caillot

(10) Patent No.: US 9,744,948 B2
(45) Date of Patent: Aug. 29, 2017

(54) WINDSCREEN WIPER

(71) Applicant: Valeo Systèmes d'Essuyage, Le Mesnil Saint Denis (FR)

(72) Inventor: Gérald Caillot, Cernay la Ville (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 66 days.

(21) Appl. No.: 14/101,852

(22) Filed: Dec. 10, 2013

(65) Prior Publication Data

US 2014/0196239 A1    Jul. 17, 2014
US 2015/0052701 A9    Feb. 26, 2015

(30) Foreign Application Priority Data

Dec. 10, 2012   (FR) ...................................... 12 61817

(51) Int. Cl.
    *B60S 1/52*        (2006.01)
    *B60S 1/38*        (2006.01)
    *B29C 47/00*     (2006.01)
    *B60S 1/34*        (2006.01)

(52) U.S. Cl.
    CPC .......... *B60S 1/524* (2013.01); *B29C 47/0066* (2013.01); *B60S 1/3415* (2013.01); *B60S 1/3425* (2013.01); *B60S 1/381* (2013.01); *B60S 1/3808* (2013.01); *B60S 1/3881* (2013.01)

(58) Field of Classification Search
CPC ........ B60S 1/524; B60S 1/381; B60S 1/3881; B60S 1/3808; B60S 1/3415; B60S 1/522
USPC .......................... 15/250.04, 250.02, 250.201
See application file for complete search history.

(56) References Cited

U.S. PATENT DOCUMENTS

| | | | | |
|---|---|---|---|---|
| 3,238,555 A | * | 3/1966 | Cels ........................... | A47L 1/16 |
| | | | | 15/250.04 |
| 3,458,888 A | * | 8/1969 | Carpenter ............... | B60S 1/524 |
| | | | | 137/832 |
| 3,969,783 A | * | 7/1976 | Shipman ................. | B60S 1/524 |
| | | | | 15/250.04 |
| 4,192,038 A | * | 3/1980 | Klein ...................... | B60S 1/524 |
| | | | | 15/250.04 |

(Continued)

FOREIGN PATENT DOCUMENTS

CN        101213121 A    7/2008
EP         1209050 A2    5/2002

(Continued)

OTHER PUBLICATIONS

FR2704817A1 (machine translation), 1994.*

(Continued)

*Primary Examiner* — Andrew A Horton
(74) *Attorney, Agent, or Firm* — Osha Liang LLP

(57) ABSTRACT

The present invention relates to a windscreen wiper (1) for a motor vehicle window (3), comprising:
   a longitudinally extending wiper blade (5),
   an aerodynamic deflector (9) extending longitudinally above said wiper blade (5),
   at least one longitudinally extending fluid circulation duct (31, 32) having at least one spraying orifice (35),
   characterized in that the wiper comprises at least one lower lateral skirt (43, 44) extending longitudinally on a lateral side of the wiper blade (5) and of the spraying orifice (35), the spraying orifice (35) being located between the wiper blade (5) and the lower lateral skirt (43, 44).

8 Claims, 3 Drawing Sheets

(56) References Cited

U.S. PATENT DOCUMENTS

| | | | | |
|---|---|---|---|---|
| 5,383,247 A * | 1/1995 | Nickel | ................... | B60S 1/488 |
| | | | | 15/250.01 |
| 6,119,300 A * | 9/2000 | Schmid | ................... | B60S 1/38 |
| | | | | 15/250.04 |
| 6,836,924 B2 * | 1/2005 | Egan-Walter | ........... | B60S 1/381 |
| | | | | 15/250.04 |
| 2008/0216274 A1 * | 9/2008 | Egner-Walter | .......... | B60S 1/524 |
| | | | | 15/250.02 |
| 2011/0271478 A1 * | 11/2011 | Liu | ...................... | B60S 1/3808 |
| | | | | 15/250.04 |
| 2011/0302738 A1 * | 12/2011 | Egner-Walter | .......... | B60S 1/381 |
| | | | | 15/250.201 |

FOREIGN PATENT DOCUMENTS

| | | | | | |
|---|---|---|---|---|---|
| FR | 1497802 | A * | 10/1967 | .............. | B60S 1/524 |
| FR | 2695606 | A1 * | 3/1994 | ........... | B60S 1/3806 |
| FR | 2704817 | A1 * | 11/1994 | ............... | B60S 1/38 |
| GB | 2479709 | A | 10/2011 | | |

OTHER PUBLICATIONS

The First Office Action issued in corresponding Chinese Patent Application No. 201310697986.8, issued on Oct. 17, 2016 (16 pages).

* cited by examiner

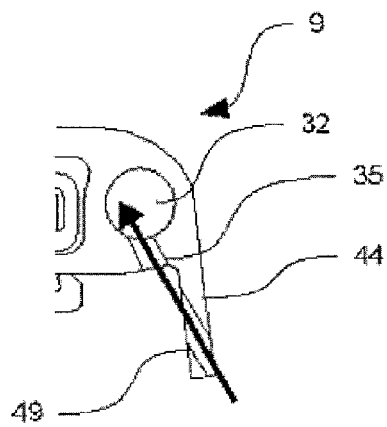
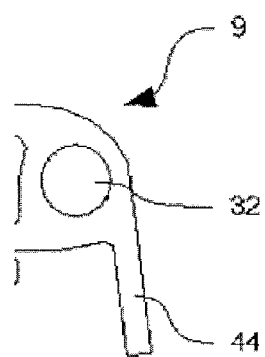
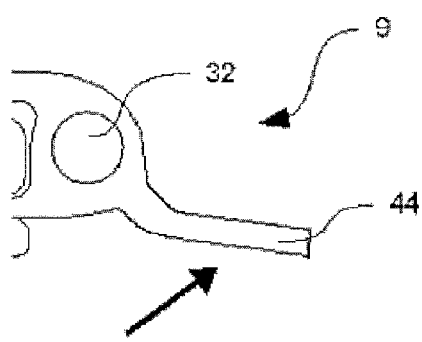
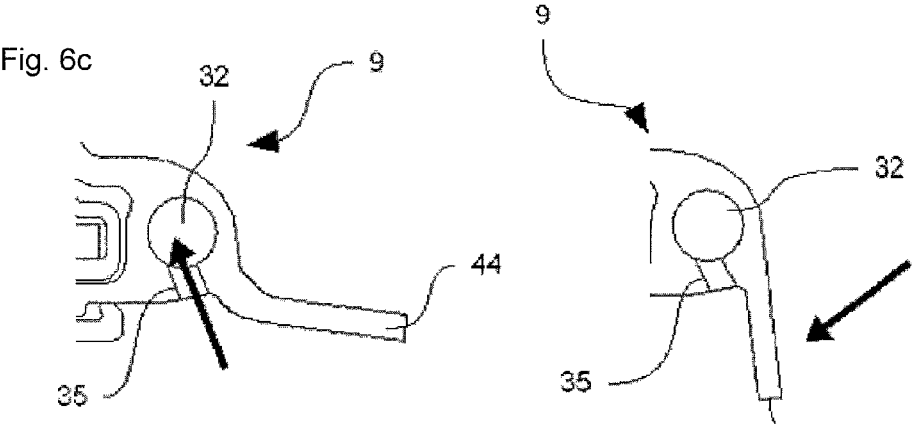
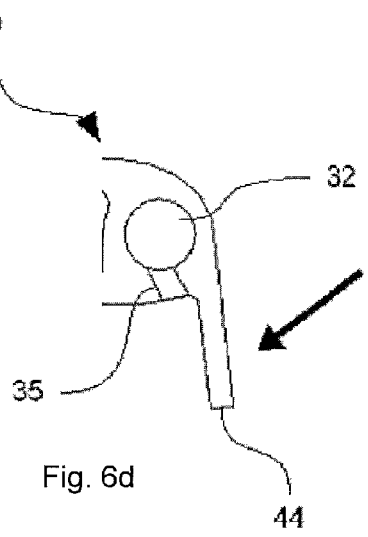

WINDSCREEN WIPER

The invention relates to a windscreen wiper for a motor vehicle window. More particularly, the invention relates to a windscreen wiper comprising an aerodynamic deflector and at least one integrated nozzle for windscreen washer liquid.

When a vehicle is moving at high speed, its windscreen wiper or wipers and also the wiper arm thereof are subjected to air streams that can lift the windscreen wiper in places from the window. This lifting leaves a film of water and/or of windscreen washer liquid on the surface to be wiped and ultimately hampers the visibility of the driver. In addition, the jets of windscreen washer liquid projected by the windscreen wiper are also subjected to these air streams and also to air streams that arise from disturbances brought about by the windscreen wiper or wipers and also the wiper arm thereof, these disturbances modifying the trajectories of said jets. Consequently, the windscreen washer liquid is poorly distributed over the window of the vehicle, and the cleaning thereof is compromised.

Figure 1:
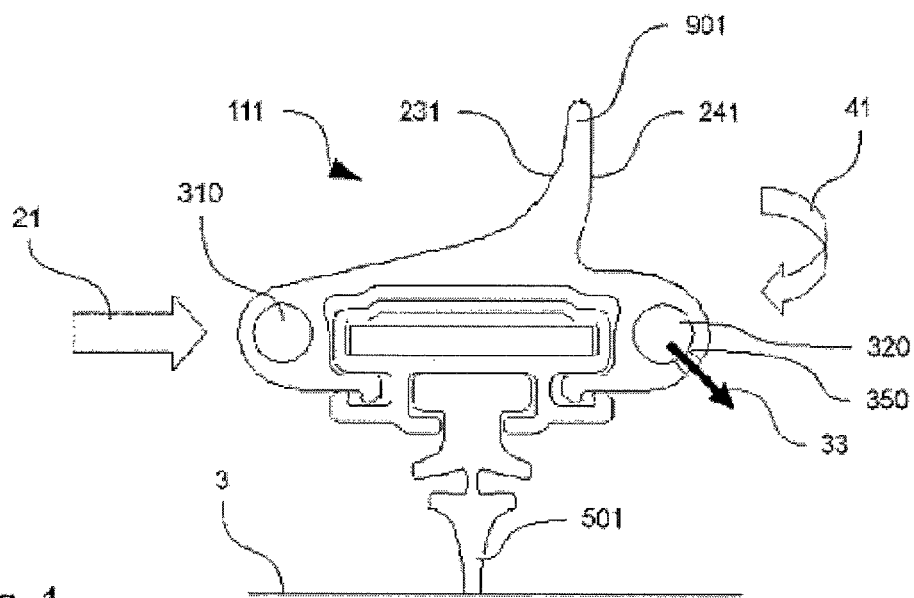

A prior art windscreen wiper 111 as shown in FIG. 1 is known. Such a prior art windscreen wiper 111 comprises a wiper blade 501, an aerodynamic deflector 901 located above the wiper blade 501 and at least one nozzle for windscreen washer liquid, said nozzle comprising a fluid circulation duct 310, 320 and a spraying orifice 350. When the prior art windscreen wiper 111 is in operation, that is to say when it is wiping the window 3 of the vehicle, it is subjected to the air stream 21 that flows towards an upstream face 231 of the aerodynamic deflector 901, and to the recirculating air stream 41 that flows in the opposite direction towards a downstream face 241 of the aerodynamic deflector 901. The aerodynamic deflector 901 diverts a part of the air streams 21 upwards. Thus, the aerodynamic deflector 901 is subjected to an aerodynamic pressure force which tends to press it, and also the prior art windscreen wiper 111, towards the window 3.

However, the prior art windscreen wiper 111 is not able to protect the jets of windscreen washer liquid 33 from the air streams 21, 41. The trajectory of the jets of windscreen washer liquid 33 is disturbed, for example a part of the windscreen washer liquid 33 does not reach the window 3, and the efficacy of the windscreen wiper 111 is compromised.

One of the aims of the present invention is to at least partially remedy this drawback of the prior art by proposing an improved windscreen wiper that is able to protect the jets of windscreen washer liquid from the air streams.

To this end, the subject of the present invention is a windscreen wiper device for a motor vehicle window, comprising:
   a longitudinally extending wiper blade,
   an aerodynamic deflector extending longitudinally above said wiper blade,
   at least one longitudinally extending fluid circulation duct having at least one spraying orifice,
characterized in that the wiper comprises at least one lower lateral skirt extending longitudinally on a lateral side of the wiper blade and of the spraying orifice, the spraying orifice being located between the wiper blade and the lower lateral skirt.

In a particularly advantageous manner, the fluid circulation duct may be located in a lateral part of the deflector.

According to one or more features of the windscreen wiper, taken on their own or in combination:
   the at least one lower lateral skirt is inclined with respect to the wiper blade.
   the lower lateral skirt is inclined at an inclination angle of between 0° and 60°.
   the spraying orifice has a spraying direction directed approximately parallel to the wiper blade.
   the spraying orifice has a spraying direction directed approximately towards the lower lateral skirt.
   the lower lateral skirt has at least one relief for projecting the jet of windscreen washer liquid in the spraying direction.
   the aerodynamic deflector comprises an upstream face and a downstream face, characterized in that said upstream face and downstream face are in the form of circular arcs.

The invention also comprises a method for manufacturing a windscreen wiper, comprising the following steps:
   a profiled element comprising at least one lower lateral skirt and at least one fluid circulation duct is extruded,
   at least one spraying orifice is pierced into the at least one fluid circulation duct through the lower lateral skirt.

The manufacturing method may also comprise the following steps:
   a profiled element comprising at least one lower lateral skirt and at least one fluid circulation duct is extruded,
   access is opened up to a lower part of the at least one fluid circulation duct,
   a spraying orifice is pierced into the at least one fluid circulation duct,
   the access to the lower part of the at least one fluid circulation duct is barred again,
   the access to a lower part of the at least one fluid circulation duct is opened up by lifting the at least one lower lateral skirt.

Figure 2:
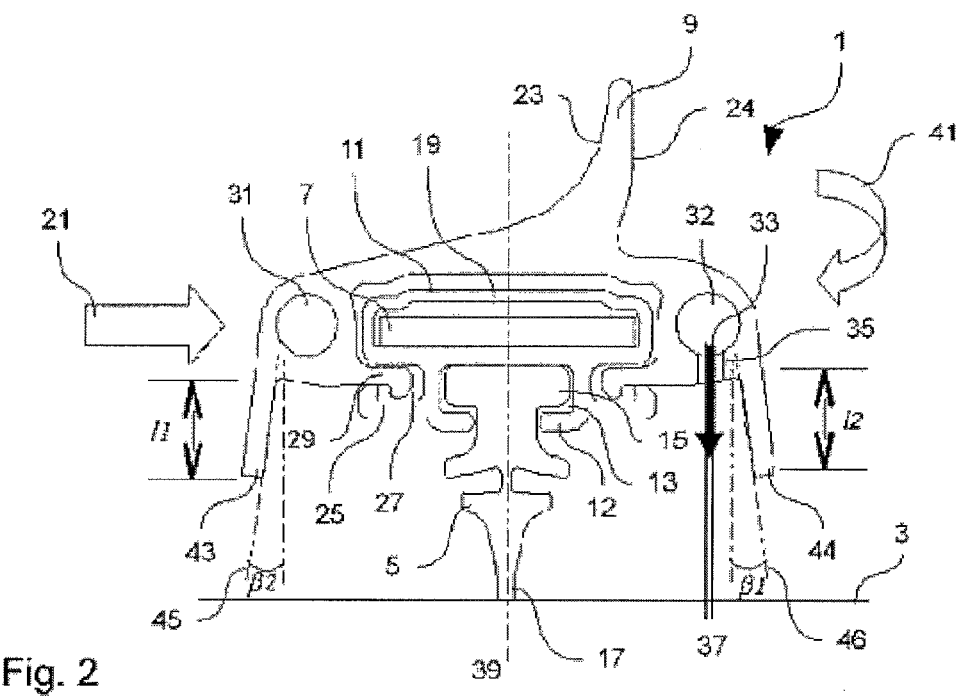
Figure 3:
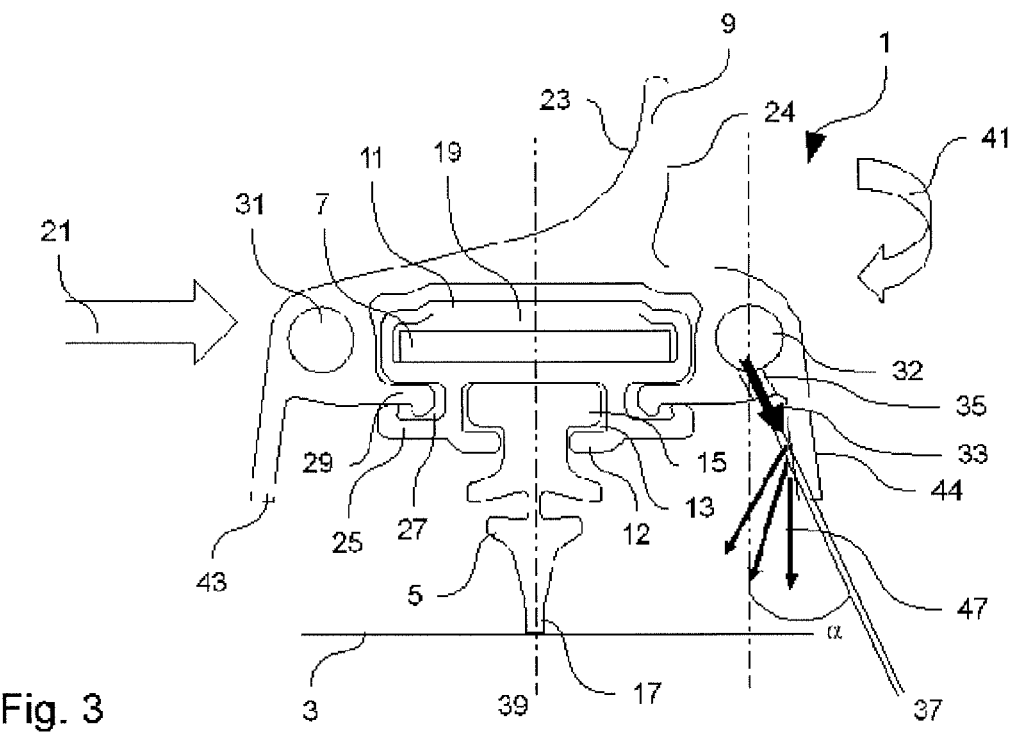
Figure 4:
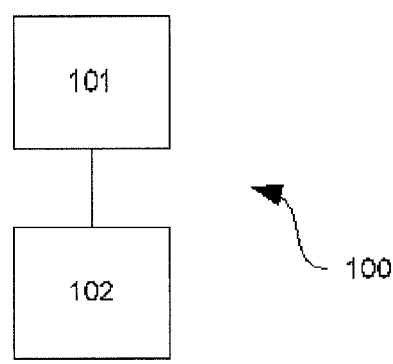

Further features and advantages of the invention will become apparent from the following description, given by way of nonlimiting example, with reference to the appended drawings, in which:

FIG. 1 shows a schematic view of a cross section through a windscreen wiper according to the prior art, FIG. 2 shows a schematic view of a cross section through a windscreen wiper according to the invention, the windscreen wiper comprising an aerodynamic deflector, the aerodynamic deflector having two lower lateral skirts, the windscreen wiper projecting windscreen washer liquid towards a vehicle window, FIG. 3 shows a schematic view of a cross section through a windscreen wiper in operation, the windscreen wiper projecting windscreen washer liquid towards a lower lateral skirt, FIG. 4 shows a flowchart of the various steps in a method for manufacturing the aerodynamic deflector, FIG. 5 illustrates a first variant of a step of piercing a spraying orifice into a fluid circulation duct according to a method for manufacturing the aerodynamic deflector, FIG. 6*a* illustrates a first step of a second variant of the step of piercing the spraying orifice into the fluid circulation duct, FIG. 6*b* illustrates a second step of the second variant of the step of piercing the spraying orifice into the fluid circulation duct, FIG. 6*c* illustrates a third step of the second variant of the step of piercing the spraying orifice into the fluid circulation duct, FIG. 6*d* illustrates a fourth step of the second variant of the step of piercing the spraying orifice into the fluid circulation duct.

In these figures, identical elements bear the same reference numerals.

In the description of the invention, the terms "vertical", "horizontal", "lower", "upper", "bottom", "top" are used in a nonlimiting manner and in order to simplify comprehension, with reference to the orientation of the trihedral frame of reference L, V, T indicated in FIGS. 2 and 3 which corresponds to the longitudinal, vertical and transverse directions of the windscreen wiper 1. Furthermore, the term "upstream" is used to designate a part located furthest upstream in a flow of an air stream to which a windscreen wiper 1 is subjected. The term "downstream" is used to designate the part located furthest downstream in the flow of the air stream.

Consideration is given to a windscreen wiper 1 extending in the longitudinal direction L. FIGS. 2 to 3 and 5 to 6d show cross sections on the transverse vertical plane (V, T) of the windscreen wiper 1. The windscreen wiper 1 is intended to wipe a motor vehicle window 3, for example a front windscreen of the vehicle. In the figures, the window 3 is shown in a manner horizontal and parallel to the longitudinal direction L and the vertical direction V. In reality, the window 3 may be curved.

The windscreen wiper 1 generally comprises a wiper blade 5, at least one stiffening blade 7 and an aerodynamic deflector 9. These elements 5, 7, 9 are assembled by way of a mount 11 of the windscreen wiper. The mount 11 is produced for example by moulding rigid or semi-rigid plastics material.

A lower part of the windscreen wiper 1 comprises the wiper blade 5. To this end, the mount 11 has two opposite lower ribs 12 having an "L"-shaped section that form hooks which delimit a downwardly open lower cavity 13. This lower cavity 13 receives a head 15 of the wiper blade. The wiper blade 5 has a lower scraper 17 intended to be in contact with the window 3 of the vehicle. The wiper blade 5 is conventionally made of rubber or a natural or synthetic elastomer material produced by extrusion or moulded.

A central part of the windscreen wiper 1 comprises the stiffening blade 7, having a substantially rectangular cross section, which is for example inserted into an upper part of the mount 11. For this purpose, the mount 11 delimits a hollow internal housing 19 located in line with the lower cavity 13. The internal housing 19 has a substantially rectangular contour in which the stiffening blade 7 is received. This stiffening blade 7 is advantageously received with play so as to allow slight relative movements in particular in the longitudinal direction in order to allow the windscreen wiper 1 to bend. In association with the mount 11, it forms a structure of the windscreen wiper 1 and gives the windscreen wiper 1 its elasticity in the vertical and longitudinal plane, allowing the windscreen wiper to adapt to the shape and in particular the curve of the outer face or upper face of the window 3 to be wiped. The stiffening blade 7 is produced for example from steel.

An upper part of the windscreen wiper comprises the aerodynamic deflector 9. The aerodynamic deflector 9 protects the windscreen wiper from air streams 21 which flow along the window 3 to be wiped when the vehicle is moving. In particular, it slows the air streams and allows a pressure to be exerted on it and thus on the windscreen wiper 1, this pressure pressing the latter against the window 3.

The aerodynamic deflector 9 may have an upstream face 23 and a downstream face 24. The air streams 21 are slowed and diverted by the upstream face 23, with the result that the windscreen wiper 1 is subjected to an aerodynamic pressure force which tends to press the aerodynamic deflector 9 and the windscreen wiper 1 in the direction of the window 3.

According to the example illustrated, the cross section of the upstream face 23 and also the cross section of the downstream face 24 are substantially in the form of circular arcs. Of course, other shapes are possible, for example the upstream face 23 and downstream face 24 may be substantially straight, forming an inclined plane.

It is, however, possible for the deflector 9 not to have an upstream face 23 and downstream face 24 and simply to have a shape which is planar on the top or slightly profiled and allowing sufficient slowing of the air streams to press the windscreen wiper 1 against the window 3.

The aerodynamic deflector 9 is produced for example by extrusion of a rigid or flexible synthetic material.

The aerodynamic deflector 9 is assembled on the mount 11. For this purpose, the mount 11 comprises for example two opposite lateral ribs 25 having an "L"-shaped section that form hooks which delimit lateral recesses 27. The aerodynamic deflector has opposite lateral protrusions 29 having an "L"-shaped section that form hooks. The opposite lateral protrusions 29 are received in the lateral recesses 27 with play so as to allow slight relative movements in particular in the longitudinal direction. The hooks of the lateral ribs 25 and the hooks of the lateral protrusions 29 are in opposite directions. Thus, the deflector 9 and the mount 11 remain firmly joined together.

The windscreen wiper 1 also comprises at least one fluid circulation duct 31, 32 able to allow the circulation of the windscreen washer liquid 33, represented by a solid arrow. In the examples shown in FIGS. 2 and 3, the windscreen wiper 1 comprises two circulation ducts 31, 32. At least one of the fluid circulation ducts 31, 32 comprises at least one spraying orifice 35. The spraying orifice 35 allows the windscreen washer liquid 33 to be projected away from the windscreen wiper 1. Preferably, the fluid circulation duct 31 comprises a plurality of spraying orifices 35 that are longitudinally distributed. According to the examples shown, only one of the circulation ducts 31 comprises a visible spraying orifice 35. The spraying orifice 35 is directed substantially downwardly, that is to say in the direction of the window 3. More particularly, the spraying orifice 35 has a spraying direction 37 represented by a double line. This spraying direction 37 may be at an angle α (visible in FIG. 3) with a vertical axis 39 of the wiper blade 5. The vertical axis 39 of the wiper blade 5 is shown by a dashed line; for better understanding, this vertical axis 39 is plotted by translation along the transverse axis T at different locations in the figures. This angle α is acute, being for example between 0° and 45°. In FIG. 2, the angle α is 0°, the jet of windscreen washer liquid 33 is projected parallel to the wiper blade 5 and directly towards the window 3.

In the example shown in FIGS. 2 and 3, the aerodynamic deflector 9 comprises two circulation ducts 31, 32 positioned on either side of the mount 11. In a first variant, a single fluid circulation duct 31, 32 is connected to the supply of windscreen washer liquid 33 (not shown). In this case, the windscreen wiper 1 is of the single spray bar type. According to the example illustrated, the downstream fluid circulation duct 32 is connected to the supply.

According to a second variant, the two circulation ducts 31, 32 are connected to one or more supplies of windscreen washer liquid 33 (not shown). In this case, the windscreen wiper 1 is of the double spray bar type. The two circulation ducts 31, 32 each have at least one spraying orifice 35. The respective spraying directions 37 of these spraying orifices 35 may be different.

Advantageously, a single model of aerodynamic deflector 9 is extruded with two circulation ducts 31, 32 for windscreen washer liquid 33. Thus, this single model may be used for single spray bar or double spray bar windscreen wipers. In this way, the manufacturing costs are reduced.

The windscreen wiper 1 comprises an improved aerodynamic deflector 9 that not only guides the flow of the air streams such that the windscreen wiper 1 remains in proper contact with the window 3, but also protects the jets of windscreen washer liquid 33 from the air streams 21, 41 on the upstream side and downstream side. Specifically, the air streams 21 diverted by the upstream face 23 of the aerodynamic deflector 9 recirculate on the downstream-face 24 side. The recirculation of the air streams is shown by the curved arrow 41.

For this purpose, the aerodynamic deflector 9 comprises at least one lower lateral skirt 43, 44 extending on a longitudinal side of the wiper blade 5 and of the spraying orifice 35. In the example illustrated, the aerodynamic deflector 9 comprises two lower lateral skirts 43, 44 extending on either side of the wiper blade 5. The spraying orifices 35 are thus located between the wiper blade 5 and the lower lateral skirts 43, 44. Consequently, the jet of windscreen washer liquid 33 projected from the spraying orifices 35 is protected from the air streams 21, 41. The windscreen washer liquid 33 strikes the window 33 and cleaning is thus improved.

The lower lateral skirts 43, 44 are directed in an inclination direction 45, 46 opposite to the wiper blade 5. The inclination direction 45, 46 is represented by a dot-dash line. The inclination direction 45, 46 forms an inclination angle $\beta_1$, $\beta_2$ with the vertical axis 39 of the wiper blade. This inclination angle $\beta_1$, $\beta_2$ is between 0° and 60°. The inclination angle $\beta_1$, $\beta_2$ is decided depending on the efficacy of washing and the desired aerodynamic performance. Preferably, the angle $\beta_1$, $\beta_2$ is non-zero, and the lower lateral skirt 43, 44 is inclined with respect to the wiper blade 5.

The lower lateral skirt 43, 44 has a length $l_1$, $l_2$ for example between 1 and 5 mm, such that the end of the lower lateral skirt 43, 44 does not come into contact with the window 3 in spite of the pressing of the windscreen wiper on account of the air streams and also the wear of the lower scraper 17 over time. This length $l_1$, $l_2$ is decided depending on the efficacy of washing and the desired aerodynamic performance.

According to a variant shown in FIG. 2, the spraying orifices 35 are directed substantially parallel to the vertical axis of the wiper blade. Thus, the jets of liquid 33 protected from the air streams 21, 41 are directed substantially perpendicularly to the window 3 of the vehicle.

According to another variant shown in FIG. 3, the spraying orifices 35 are directed towards the downstream lower lateral skirt 44. Thus, the jets of liquid 33 are projected onto the downstream lower lateral skirt 44. When the jets of liquid 33 strike the downstream lower lateral skirt 44, they explode in a plurality of directions 44 before striking the window 3. Thus the windscreen washer liquid is distributed over a larger surface area of the window 3, thereby improving the cleaning of the window 3.

When the windscreen wiper is of the double spray bar type, the jets of liquid coming from the orifices of the upstream fluid circulation duct 31 are projected in the direction of the upstream lower lateral skirt 43.

According to another variant shown in FIG. 5, the lower lateral skirt 43, 44 (only one lower lateral skirt is shown in FIG. 5) may have a projection relief 49 directed in the same spraying direction 37. The jet of liquid 33 is thus projected in the direction of the projection relief 49. On making contact therewith, it explodes in a plurality of directions (not shown), and thus the windscreen washer liquid is distributed over a larger surface area of the window 3, thereby improving the cleaning of the window 3 by avoiding the appearance of streaks. The projection relief 49 comprises for example a hole.

Advantageously, and as shown in FIGS. 2 and 3, the aerodynamic deflector 9 comprises two lower lateral skirts 43, 44 extending longitudinally on either side of the wiper blade 5. One lower lateral skirt is thus located upstream 43, and one lower lateral skirt is located downstream 44. Thus, a single model of aerodynamic deflector 9 may be used for windscreen wipers 1 of the double spray bar type and of the single spray bar type. The manufacturing costs are thus reduced.

The upstream lower lateral skirt 43 and the downstream lower lateral skirt 44 may have different inclination angles, $\beta_1$, $\beta_2$, respectively. These inclination angles $\beta_1$, $\beta_2$ are decided depending on the efficacy of washing and the desired aerodynamic performance. The upstream lower lateral skirt 43 and the downstream lower lateral skirt 44 may have different lengths $l_1$, $l_2$, respectively. These lengths $l_1$, $l_2$ are decided depending on the efficacy of washing and the desired aerodynamic performance.

The invention also relates to a method 100 for manufacturing (FIG. 4) an aerodynamic deflector 9.

During a first step 101 of the method for manufacturing the aerodynamic deflector 9, a profiled element comprising the aerodynamic deflector 9, at least one lower lateral skirt 43, 44 and at least one fluid circulation duct 31 is extruded.

During a second step 102, at least one spraying orifice 35 is pierced into at least one fluid circulation duct 31. In this step of the method, it is noted that the lower lateral skirt 43, 44 bars access to the lower part of the fluid circulation duct 31 and prevents the latter from being pierced directly.

According to a first embodiment of the second step 102 (see FIG. 5), a projection relief 49 is produced simultaneously with the piercing of at least one spraying orifice 35.

Consequently, the spraying orifice 35 is pierced through the lower lateral skirt 43, 44. In doing so, a hole is also pierced into the lower lateral skirt 43, 44. This is because the lower lateral skirt 43, 44 bars access to the fluid circulation duct 32 and prevents the latter from being pierced directly. The spraying orifice 35 and the hole in the lower lateral skirt 43, 44 have the same spraying direction 37. The hole thus pierced forms the projection relief 49. The spraying direction 37 of the spraying orifice 35 and of the hole is opposite to the wiper blade 5. The spraying orifice 35 and the hole are pierced for example by way of a laser. Preferably, a plurality of spraying orifices 35 and holes are pierced over the length of at least one fluid circulation duct 32. Piercing a single fluid circulation duct 31 will make it possible to produce a single spray bar windscreen wiper. Piercing the two circulation ducts 32 will make it possible to produce a double spray bar windscreen wiper.

According to a second embodiment of the second step 102 (see FIGS. 6a to 6d), access to a lower part of the fluid circulation duct 32 is opened up, for example the lower lateral skirt 43, 44 is lifted (FIG. 6a) by way of a mobile barrier (not shown). Opened up in this way, the lower part of the fluid circulation duct 32 is directly accessible (FIG. 6b). Next, an orifice 35 is pierced into the fluid circulation duct 32 in a direction 37 (FIG. 6c). Finally, the access to the fluid circulation duct 32 is barred again, for example by withdrawing the mobile barrier (FIG. 6d).

It will thus be understood that a windscreen wiper 1 comprising at least one lower lateral skirt 43, 44 makes it possible to protect the jet of windscreen washer liquid 33 from the air streams 21, 41 flowing in the vicinity of the window 3 of the vehicle when the vehicle is moving. Thus, the windscreen washer liquid can reach the window and washing is improved.

In addition, the jet of windscreen washer liquid 33 may be directed towards the lower lateral skirt 43, 44. On making contact with the lower lateral skirt 43, 44, the jet of windscreen washer liquid 33 explodes in a plurality of directions. The windscreen washer liquid is thus distributed better over the window 3 and washing is further improved.

The invention claimed is:

1. A windscreen wiper for a motor vehicle window, comprising:
   a longitudinally extending wiper blade;
   an aerodynamic deflector that deflects air streams from the windscreen wiper,
   wherein the aerodynamic deflector extends longitudinally above a head of said wiper blade,
   wherein the aerodynamic deflector comprises at least one lower lateral skirt, and
   wherein the aerodynamic deflector and the at least one lower lateral skirt are monolithic;
   at least one longitudinally extending fluid circulation duct having at least one spraying orifice; and
   wherein the at least one lower lateral skirt extends longitudinally on a lateral side of the wiper blade and of the spraying orifice, the spraying orifice is located between the wiper blade and the at least one lower lateral skirt,
   wherein the spraying orifice has a spraying direction directed at the at least one lower lateral skirt, and
   wherein the head of the wiper blade extends into a recess of a mount, the mount is located between the aerodynamic deflector and the wiper blade, and the aerodynamic deflector is mounted on the mount.

2. The windscreen wiper according to claim 1, wherein said at least one fluid circulation duct is located in a lateral part of the aerodynamic deflector.

3. The windscreen wiper according to claim 1, wherein the at least one lower lateral skirt is inclined with respect to the wiper blade.

4. The windscreen wiper according to claim 3, wherein the at least one lower lateral skirt is inclined at an inclination angle of between 0° and 60°.

5. The windscreen wiper according to claim 1, wherein the at least one spraying orifice has the spraying direction directed approximately parallel to the wiper blade.

6. The windscreen wiper according to claim 1, wherein the at least one lower lateral skirt has at least one relief for projecting a jet of windscreen washer liquid in the spraying direction.

7. The windscreen wiper according to claim 1, wherein the aerodynamic deflector comprises an upstream face and a downstream face, and wherein said upstream face and downstream face are in the form of circular arcs.

8. The windscreen wiper according to claim 1, wherein the aerodynamic deflector comprises lateral protrusions that extend into lateral recesses of the mount located between the aerodynamic deflector and the wiper blade.

* * * * *